US009232231B2

United States Patent
Laroche et al.

(10) Patent No.: US 9,232,231 B2
(45) Date of Patent: Jan. 5, 2016

(54) PREDICTION OF IMAGES BY REPARTITIONING OF A PORTION OF REFERENCE CAUSAL ZONE, CODING AND DECODING USING SUCH A PREDICTION

(75) Inventors: Guillaume Laroche, Rennes (FR); Joël Jung, Le Mesnil Saint-Denis (FR)

(73) Assignee: Orange, Paris (FR)

(*) Notice: Subject to any disclaimer, the term of this patent is extended or adjusted under 35 U.S.C. 154(b) by 742 days.

(21) Appl. No.: 13/140,092

(22) PCT Filed: Dec. 16, 2009

(86) PCT No.: PCT/FR2009/052560
§ 371 (c)(1),
(2), (4) Date: Jun. 16, 2011

(87) PCT Pub. No.: WO2010/072946
PCT Pub. Date: Jul. 1, 2010

(65) Prior Publication Data
US 2011/0249751 A1   Oct. 13, 2011

(30) Foreign Application Priority Data
Dec. 22, 2008   (FR) ..................... 08 58972

(51) Int. Cl.
*H04N 7/12* (2006.01)
*H04N 19/537* (2014.01)
*H04N 19/52* (2014.01)
*H04N 19/51* (2014.01)
*H04N 19/61* (2014.01)

(52) U.S. Cl.
CPC ............ *H04N 19/537* (2014.11); *H04N 19/51* (2014.11); *H04N 19/52* (2014.11); *H04N 19/61* (2014.11)

(58) Field of Classification Search
CPC ..... H04N 19/51; H04N 19/52; H04N 19/537; H04N 19/61
USPC ..................................... 375/240.16
See application file for complete search history.

(56) References Cited

U.S. PATENT DOCUMENTS

| 2001/0026590 A1 | 10/2001 | Kang et al. |
| 2004/0008778 A1 | 1/2004 | Yang et al. |

(Continued)

OTHER PUBLICATIONS

Sullivan et al., "Rate-Distortion Optimization for Video Compression," IEEE Signal Processing Magazine, pp. 74-90 (Nov. 1998).

*Primary Examiner* — Jessica M Prince
(74) *Attorney, Agent, or Firm* — Drinker Biddle & Reath LLP

(57) ABSTRACT

A method is provided for decoding a data stream representative of an image or of a sequence of images, the stream comprising data representative of at least one portion of one of the images, the method implementing a step of predicting a motion vector of a partition of a current image portion, with respect to a reference causal zone which has been partitioned according to a mode of coding determined for the zone. The prediction step comprises, in relation to said current partition: partitioning anew at least one portion of the reference causal zone into a plurality of reference partitions, determining motion vectors respectively associated with reference partitions obtained subsequent to the new partitioning, determining a predictor motion vector on the basis of said determined motion vectors, and predicting the motion vector of said current partition on the basis of said determined predictor motion vector.

14 Claims, 6 Drawing Sheets

(56) References Cited

U.S. PATENT DOCUMENTS

| | | | |
|---|---|---|---|
| 2004/0223548 A1* | 11/2004 | Kato | H04N 19/00696 375/240.16 |
| 2006/0233253 A1* | 10/2006 | Shi | H04N 19/139 375/240.16 |
| 2006/0256852 A1 | 11/2006 | Prakash et al. | |
| 2008/0043842 A1* | 2/2008 | Nakaishi | H04N 19/119 375/240.16 |
| 2008/0107181 A1 | 5/2008 | Han et al. | |
| 2008/0152010 A1* | 6/2008 | Youn | H04N 19/139 375/240.16 |
| 2008/0198934 A1 | 8/2008 | Hong et al. | |
| 2008/0240246 A1* | 10/2008 | Lee | H04N 19/176 375/240.16 |
| 2008/0253457 A1 | 10/2008 | Moore | |

\* cited by examiner

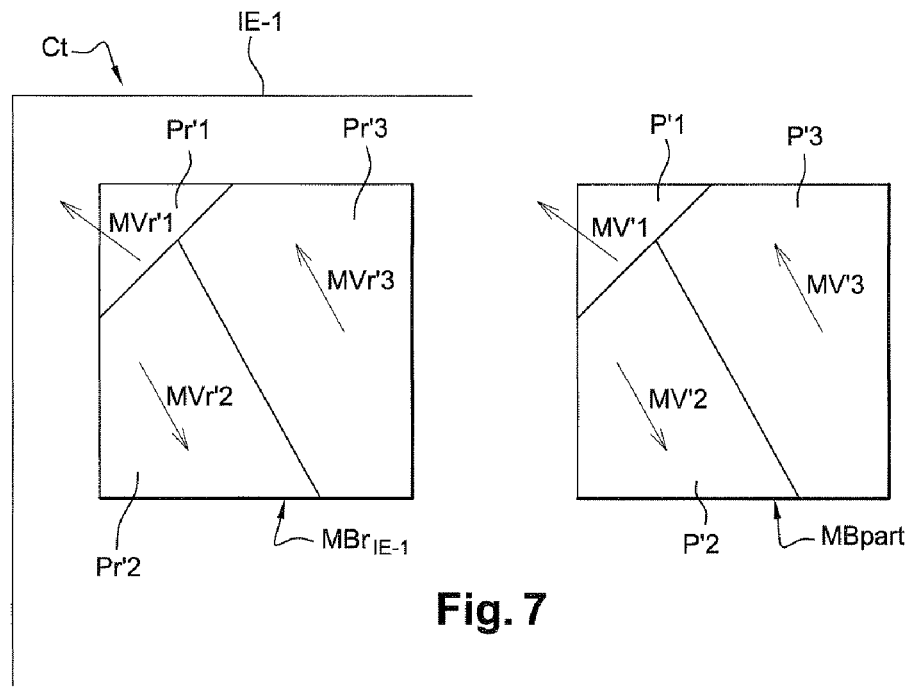
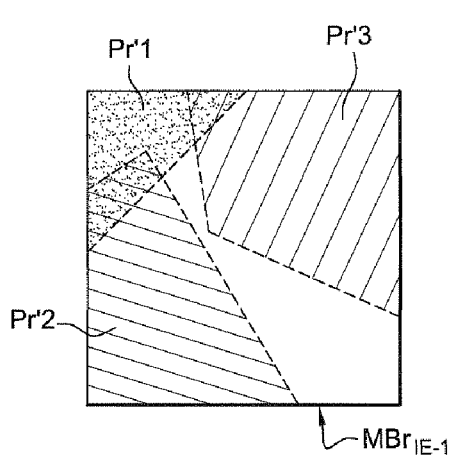 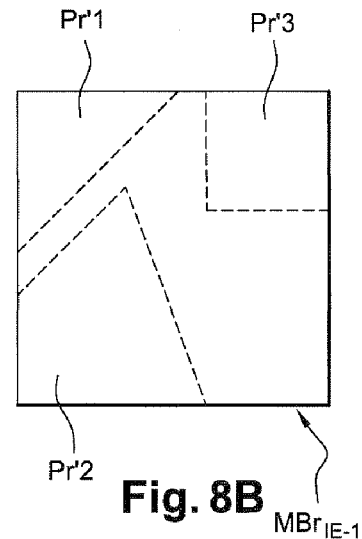
Fig. 7
Fig. 8A  Fig. 8B

PREDICTION OF IMAGES BY REPARTITIONING OF A PORTION OF REFERENCE CAUSAL ZONE, CODING AND DECODING USING SUCH A PREDICTION

CROSS-REFERENCE TO RELATED APPLICATIONS

This application is the U.S. national phase of the International Patent Application No. PCT/FR2009/052560 filed Dec. 16, 2009, which claims the benefit of French Application No. 08 58972 filed Dec. 22, 2008, the entire content of which is incorporated herein by reference.

BACKGROUND

The present invention pertains generally to the field of image processing, and more precisely to the coding and to the decoding by competition of digital images and of sequences of digital images.

Several coding and decoding methods exist for the transmission of images. Mention may be made in particular of major types of coding such as so-called "intra" coding where an image is coded in an autonomous manner, that is to say without reference to other images, or else so-called "inter" coding which consists in coding a current image with respect to past images so as to express and transmit only the difference between these images.

The coding methods of the aforementioned type generally comprise a predictive coding step according to which image portions, called blocks or macroblocks, of a current image are predicted with respect to other reference blocks or macroblocks, that is to say previously coded and then decoded.

In the case for example of the H264/MPEG-4 AVC standard (AVC standing for "Advanced Video Coding"), the predictive coding of a macroblock consists in chopping the macroblocks according to a plurality of partitions generally having the form of blocks of smaller size.

More precisely, during the predictive coding of a macroblock in accordance with the aforementioned standard, with the exception of a macroblock of 16×16 type, the macroblock is generally chopped according to a plurality of partitions generally having the form of blocks of smaller size. The spatial prediction of such a macroblock in an image consists in predicting each block of smaller size forming this macroblock with respect to one or more blocks of another macroblock of this same image having already been coded and then decoded, such a macroblock being called a reference macroblock. This prediction is possible only if the reference macroblock neighbors the macroblock to be predicted and is situated in certain predetermined directions with respect to it, that is to say generally above and to the left, in a so-called "causal" neighborhood.

The drawback of such a type of prediction resides in the fact that for a given transmission rate from the coder to the decoder, it achieves worse video quality than inter coding since it does not exploit the temporal correlations between the images of the sequence.

In the case of inter coding, the current macroblock to be coded may be partitioned according to the 16×16, 8×16, 16×8 and 8×8 modes. If the 8×8 mode is selected, each 8×8 block is again partitioned according to the 8×8, 4×8, 8×4 and 4×4 modes. Each current block is compared with one or more blocks of a reference causal zone, of spatial or temporal type, which comprises macroblocks already decoded at the level of the coder during the coding by the latter of a current macroblock. A temporal predictor is then defined by a vector which describes the motion between the current block and the reference block.

FIG. 1A represents the case of a spatial prediction of a vector MVc of a current block to be inter coded, denoted BCa, which utilizes the spatial correlations between the various macroblocks of one and the same image Ia. Such a block is chopped according to for example 16 smaller partitions P1 . . . P16, each of size 4×4. For the sake of clarity in the figure, only the partition P1 is represented. In accordance with the H264/AVC standard, the partition P1 is predicted with reference to a reference causal zone Cs, which comprises four blocks each of size 16×16, denoted BR1, BR2, BR3 and BR4 in FIG. 1A, these being neighbors of said partition P1. More precisely, the calculation of the motion vector MVc of the partition P1 is undertaken. A prediction procedure consists in calculating for example the motion vectors MV1, MV2 and MV3 corresponding respectively to the reference macroblocks BR1, BR2 and BR3, and then in calculating the median of the vectors MV1, MV2 and MV3 so as to deduce therefrom the motion vector which serves to predict the vector MVc of the partition P1 to be coded.

A drawback of the prediction represented in FIG. 1A resides in the fact that:
  the mean spatial distance between the pixels of the current partition P1 to be coded and the pixels of the macroblocks BR1, BR2 and BR3 is relatively high,
  and that the vectors MV1, MV2 and MV3 have been calculated in relation to macroblocks of very different size from that of the current partition P1 to be coded.

It follows from this that such a prediction lacks precision.

FIG. 1B now represents the case of a temporal prediction of a current macroblock to be inter coded, denoted $MBC_N$, which belongs to an image N to be coded. Such a prediction utilizes the temporal correlations between, the macroblock $MBC_N$ and the macroblock or macroblocks of a plurality of already coded and then decoded reference images, which constitute a temporal reference causal zone. In the example represented, the temporal reference causal zone, denoted Ct, comprises just the previous image N-1. In other examples, the reference causal zone could comprise, not only the image N-1, but also the images N-2, N-3, etc. Such a macroblock $MBC_N$ is chopped according to for example three smaller partitions P'1, P'2, P'3, which are, in the example represented, of arbitrary geometric shape. The procedure for utilizing the temporal correlations consists in calculating the three current motion vectors MV'1, MV'2 and MV'3 respectively associated with the three partitions P'1, P'2 and P'3 as a function of the motion vector, denoted MVcol, which belongs to the macroblock, denoted $MBC_{N-1}$, having the same position as the current macroblock $MBC_N$ in the previous image N-1.

A drawback of the prediction represented in FIG. 1B resides in the fact that the partitioning of the current macroblock $MBC_N$ is different from that of the macroblock $MBC_{N-1}$, this considerably hampering the precision of the prediction of the three current motion vectors MV'1, MV'2 and MV'3. Thus, in the case of FIG. 1B, it is clear that by comparing the direction of the vector MVcol with respect to the direction of the vectors MV'1, MV'2 and MV'3, the prediction of the current motion vector MV'3 will be worse than that of the current motion vectors MV'1 and MV'2.

SUMMARY

One of the aims of the invention is to remedy drawbacks of the aforementioned prior art.

For this purpose, according to a first aspect, the present invention relates to a method for decoding a data stream representative of an image or of a sequence of images, said stream comprising data representative of at least one portion of one of the images, the method implementing a step of predicting a motion vector of a partition of a current image portion, with respect to a reference causal zone which has been partitioned according to a mode of coding determined for the zone.

According to the invention, the prediction step of such a decoding method comprises, in relation to said current partition, the steps consisting in:

partitioning anew at least one portion of the reference causal zone into a plurality of reference partitions, determining motion vectors respectively associated with reference partitions obtained subsequent to the new partitioning, determining a predictor motion vector on the basis of the determined motion vectors, predicting the motion vector of the current partition on the basis of the determined predictor motion vector.

Such a repartitioning advantageously makes it possible to predict the current motion vector of a current partition on the basis of motion vectors belonging to more suitable reference partitions, in particular from a shape, size and arrangement point of view, than those arising from the initial partitioning of at least one reference macroblock which was performed during the coding of this macroblock.

The invention thus makes it possible to significantly improve the precision of the prediction of the current vectors under inter coding.

It should moreover be noted that the reference motion vectors which are determined subsequent to the new partitioning are not used for the coding of the current partition.

According to a second aspect, the present invention relates to a method for coding an image or a sequence of images generating a data stream comprising data representative of at least one portion of one of the images, such a method implementing a step of predicting a motion vector of a partition of a current image portion, with respect to a reference causal zone which has been partitioned according to a mode of coding determined for this portion.

According to the invention, the prediction step of such a coding method comprises, in relation to said current partition, the steps consisting in:

partitioning anew at least one portion of the reference causal zone into a plurality of reference partitions, determining motion vectors respectively associated with reference partitions obtained subsequent to the new partitioning, determining a predictor motion vector on the basis of the determined motion vectors, predicting the motion vector of said current partition on the basis of said determined predictor motion vector.

According to a third aspect, the present invention relates to a method for predicting a motion vector of a partition of a current image portion, with respect to at least one reference causal zone which has been partitioned according to a mode of coding determined for the zone.

According to the invention, such a prediction method comprises, in relation to the current partition, the steps consisting in:

partitioning anew at least one portion of the reference causal zone into a plurality of reference partitions, determining motion vectors respectively associated with reference partitions obtained subsequent to the new partitioning, determining a predictor motion vector on the basis of the determined motion vectors, predicting the motion vector of said current partition on the basis of the determined predictor motion vector.

In one embodiment, the reference partitions obtained subsequent to the new partitioning are in the closest neighborhood of the current partition.

Such an arrangement thus makes it possible to further refine the precision of the prediction.

In another embodiment, a reference partition has the same position as the current partition associated with it, in an image belonging to the reference causal zone.

In yet another embodiment, the reference partition is of identical shape and identical size to those of the current partition associated with it.

Such an arrangement substantially increases the precision of the temporal prediction of the current vectors. Indeed, the reference motion vectors obtained thus describe a motion closer to the real motion between the current image portion and the reference image portion than the motion described by the reference motion vectors of the prior art.

According to yet other embodiments, the reference partitions obtained subsequent to the new partitioning overlap or are disjoint.

Correlatively, according to a fourth aspect, the present invention relates to a device for decoding a data stream representative of an image or of a sequence of images, the stream comprising data representative of at least one portion of one of the images, such a decoding device comprising a device for predicting a motion vector of a partition of a current image portion, with respect to a reference causal zone which has been partitioned according to a mode of coding determined for the zone.

According to the invention, the prediction device of such a decoding device comprises:

means for partitioning anew at least one portion of the reference causal zone into a plurality of reference partitions, means for determining motion vectors respectively associated with reference partitions obtained subsequent to the new partitioning, means for determining a predictor motion vector on the basis of the determined motion vectors, means for predicting the motion vector of the current partition on the basis of the determined predictor motion vector.

Correlatively, according to a fifth aspect, the present invention relates to a device for coding an image or a sequence of images generating a data stream comprising data representative of at least one portion of one of the images, such a device comprising a device for predicting a motion vector of a partition of a current image portion, with respect to a reference causal zone which has been partitioned according to a mode of coding determined for said zone.

According to the invention, the prediction device of such a coding device comprises:

means for partitioning anew at least one portion of the reference causal zone into a plurality of reference partitions, means for determining motion vectors respectively associated with reference partitions obtained subsequent to the new partitioning, means for determining a predictor motion vector on the basis of the determined motion vectors, means for predicting the motion vector of said current partition on the basis of the determined predictor motion vector.

Correlatively, according to a sixth aspect, the present invention relates to a device for predicting a motion vector of a partition of a current image portion, with respect to a reference causal zone which has been partitioned according to a mode of coding determined for the zone.

According to the invention, such a prediction device comprises:
means for partitioning anew at least one portion of the reference causal zone into a plurality of reference partitions,
means for determining motion vectors respectively associated with reference partitions obtained subsequent to the new partitioning,
means for determining a predictor motion vector on the basis of the determined motion vectors,
means for predicting the motion vector of the current partition on the basis of the determined predictor motion vector.

The invention further relates to a computer program comprising instructions for implementing one of the methods according to the invention, when it is executed on a computer.

The coding method, the prediction method, the decoding device, the coding device and the prediction device exhibit at least the same advantages as those afforded by the decoding method according to the present invention.

BRIEF DESCRIPTION OF THE DRAWINGS

Other characteristics and advantages will become apparent on reading preferred embodiments described with reference to the figures in which:

FIG. 7 represents an exemplary temporal prediction according to the invention which utilizes the temporal correlations between the current macroblock to be coded of an image IE and the reference macroblocks of a previous image IE-1, FIGS. 8A and 8B represent respectively two possible examples of partitioning a reference macroblock in the case of the temporal prediction of FIG. 7.

DETAILED DESCRIPTION

An embodiment of the invention will now be described, in which the coding method according to the invention is used to code a sequence of images according to a binary stream close to that obtained by a coding according to the H.264/MPEG-4 AVC standard. In this embodiment, the coding method according to the invention is for example implemented in a software or hardware manner by modifications of a coder complying initially with the H.264/MPEG-4 AVC standard. The coding method according to the invention is represented in the form of an algorithm comprising steps C0 to C7, represented in FIG. 2.

It should be noted that the decoding method according to the invention is also implemented in a software or hardware manner by modifications of a decoder complying initially with the H.264/MPEG-4 AVC standard.

Figure 3:
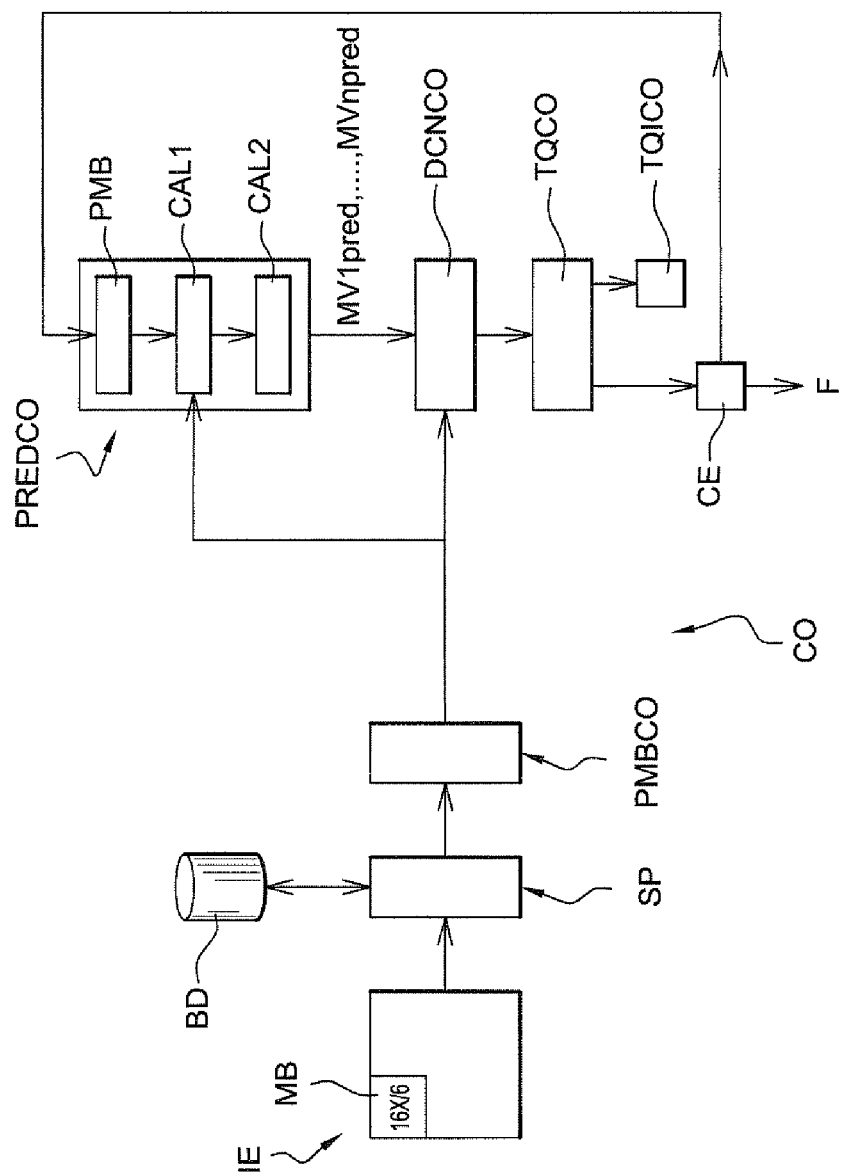
FIG. 3 represents an embodiment of a coding device according to the invention.

The coding method according to the invention is implemented in a coding device CO represented in FIG. 3.

Figure 1A:
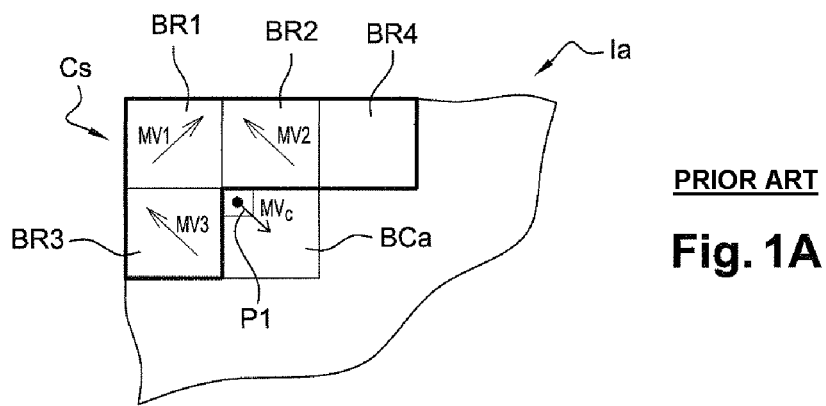
FIG. 1A represents an exemplary temporal prediction of the prior art which utilizes the spatial correlations between various macroblocks of one and the same image.
Figure 1B:
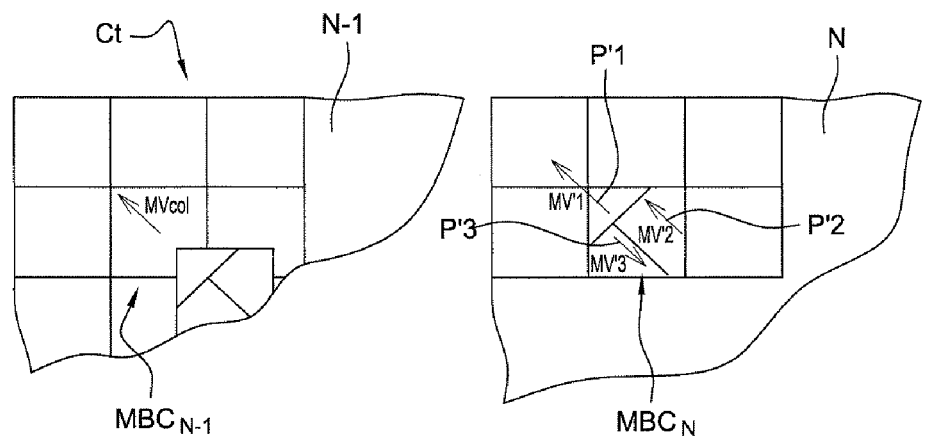
FIG. 1B represents an exemplary temporal prediction of the prior art which utilizes the temporal correlations between a current macroblock to be coded of an image N and a reference macroblock of a previous image N-1.
Figure 2:
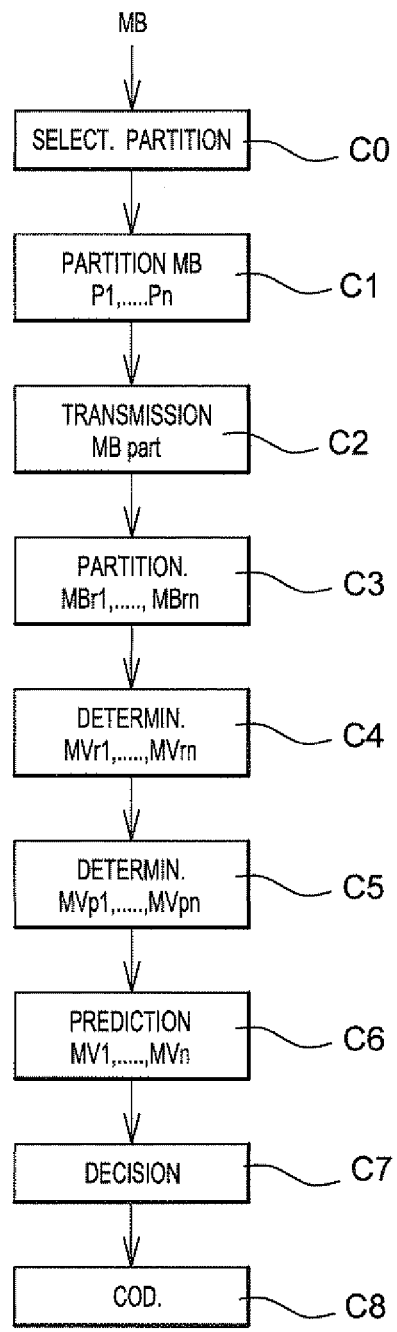
FIG. 2 represents the steps of the coding method according to the invention.

With reference to FIGS. 2 and 3, the first step C0 is the selection, for a macroblock belonging to an image IE of the sequence of images to be coded, of a smaller particular partition of pixels which is chosen from a predetermined set of partitions of predetermined shape. For this purpose, a macroblock MB, for example of size 16×16, and belonging to the image IE, is applied as input to a partitions selection module SP represented in FIG. 3.

This partitions selection module SP uses for example a procedure for choosing by exhaustive competition or else a procedure for choosing with the aid of an algorithm with a-priori. Such procedures are well known to the person skilled in the art (cf: G. J. Sullivan and T. Wiegand, "Rate-distortion optimization for video compression" *IEEE Signal Proc. Mag.*, pp. 74-90, 1998) They will not therefore be described hereinbelow.

Said partitions are grouped together in a database BD of the coder CO. Such partitions may be of rectangular or square shape or else of other geometric shapes, such as for example substantially linear shapes.

In the example represented, the selection module SP selects a square-shaped partition of size 4×4.

The following step C1 represented in FIG. 2 is the chopping of the macroblock MB according to said chosen initial partition, into a number Np of partitions. In the example represented, the macroblock MB is chopped into sixteen partitions P1, P2, . . . , P16, where P1 designates the initial partition. Such a chopping is performed by a macroblocks partitioning module PMBCO represented in FIG. 3 which uses a conventional partitioning algorithm.

Figure 4:
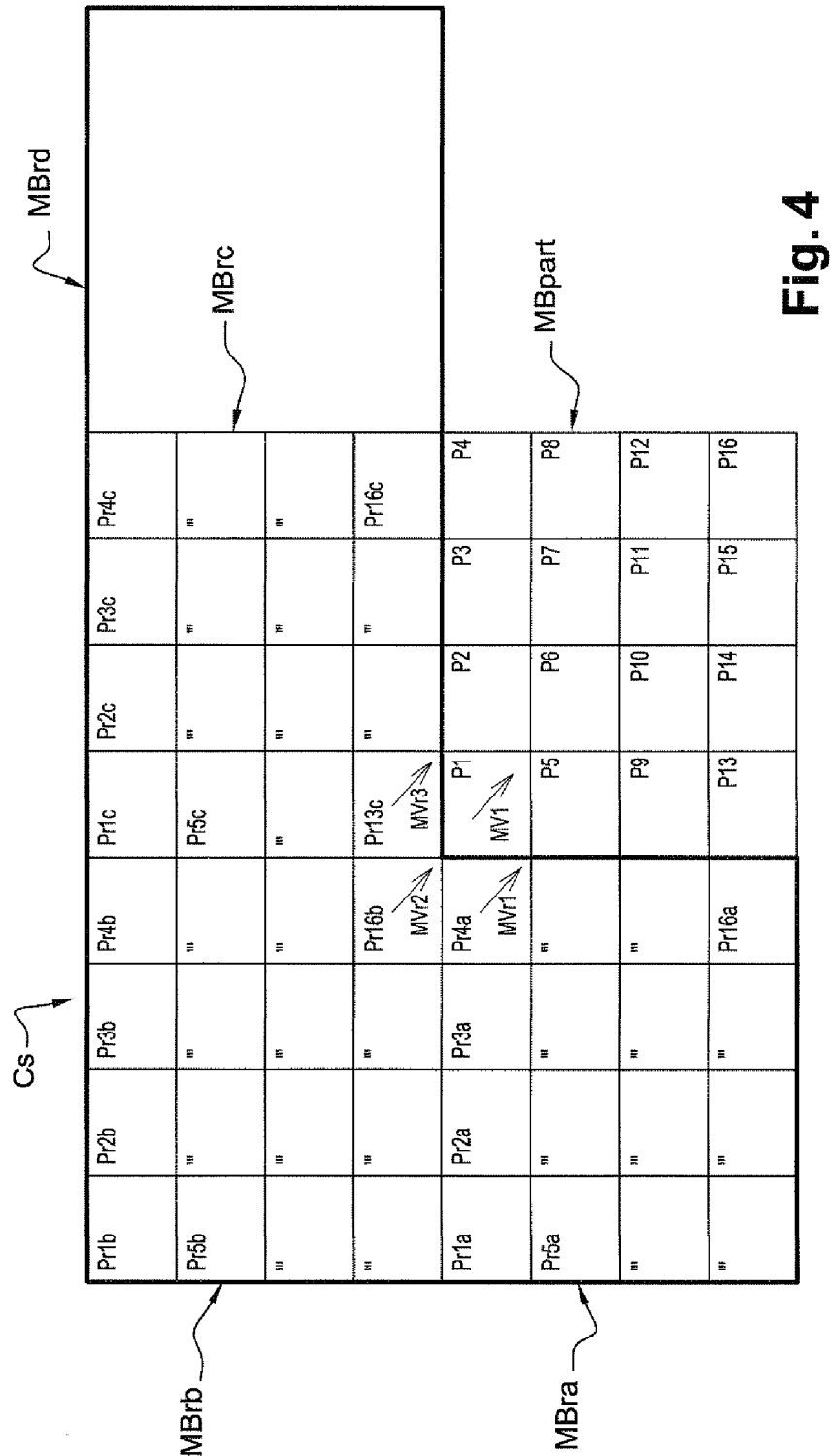
FIG. 4 represents an exemplary spatial prediction according to the invention, which utilizes the temporal correlations between the current macroblock to be coded and reference macroblocks.

FIG. 4 represents the macroblock MBpart which has been obtained after chopping according to the initial square partition P1 of size 4×4.

Subsequent to the partitioning step C1, in the course of a step C2 represented in FIG. 2, the partitioning module PMBCO transmits the macroblock MBpart which has just been partitioned to a prediction module PREDCO represented in FIG. 3.

Such a prediction module PREDCO is intended to predict the motion vector of each partition P1, . . . P16 of the current macroblock MBpart, on the basis of a predictor motion vector calculated on the basis of a portion of an already coded and then decoded reference causal zone. In the example represented in FIG. 4, the reference causal zone, denoted Cs, comprises four macroblocks MBra, MBrb, MBrc and MBrd, of which for example the three reference macroblocks MBra, MBrb and MBrc are used for the prediction of the motion vector of the partition P1, denoted MV1.

With reference to FIG. 3, such reference macroblocks are coded in accordance with the H.264/MPEG-4 AVC standard, that is to say they undergo, in a manner known per se:
a coding by discrete cosine transform and quantization which is performed by a transform and quantization module TQCO, and then a decoding by inverse discrete cosine transform and inverse quantization, which is performed by the inverse transform and quantization module TQICO.

Still with reference to FIG. 3, the prediction module PREDCO comprises, according to the invention:
- a partitioning module PMB intended to chop each of the reference macroblocks MBra, MBrb and MBrc according to Nr reference partitions,
- a first calculation module CAL1 intended to determine, for a partition to be predicted from among the sixteen partitions P1, ..., P16, one or more neighboring reference partitions of the partition to be predicted, and then to calculate a motion vector associated with each determined reference partition,
- a second calculation module CAL2 intended to calculate the motion vector of the current partition to be predicted as a function of the reference motion vectors calculated by the first calculation module CAL1.

In the course of a step C3 represented in FIG. 2, the partitioning module PMB of FIG. 3 undertakes the chopping of each of the reference macroblocks MBra, MBrb and MBrc according to Nr reference partitions. In the example represented in FIG. 4, each reference macroblock is chopped into sixteen reference partitions Pr1, Pr2, ... Pr16 which are each preferably of the same shape and of the same size as the current partition to be predicted P1, that is to say square and of size 4×4.

In the course of a step C4 represented in FIG. 2, the calculation module CAL1 of FIG. 3 calculates three reference motion vectors MVr1, MVr2 and MVr3 corresponding respectively to the closest neighboring reference partitions of the partition P1 to be predicted. As may be seen in FIG. 4, the reference partitions used are Pr4a, Pr16b and Pr13c.

In the course of a step C5, the calculation module CAL2 of FIG. 3 calculates a predictor motion vector MVp1 which is dependent on the reference motion vectors MVr1, MVr2 and MVr3 obtained in the previous step C4. Such a calculation consists for example in calculating the median of the reference motion vectors MVr1, MVr2 and MVr3 in accordance with the equation hereinbelow:

MVp1=Med (MVr1, MVr2 and MVr3)

In the course of a step C6, the prediction module PREDCO of FIG. 3 predicts the motion vector MV1 of the current partition P1 on the basis of the predictor motion vector MVp1 calculated in the previous step.

The prediction calculation module PREDCO of FIG. 3 then delivers a first predicted motion vector MV1pred which, in the case where the latter is retained by the coder CO as being the optimal vector, is immediately coded by the transform and quantization module TQCO, and then decoded by the inverse transform and quantization module TQICO.

The spatial prediction which has just been described hereinabove is particularly efficacious because of the fact that the motion vector of the current partition P1 is predicted on the basis of motion vectors which belong to reference partitions whose shape and size are much more suitable than in the prior art.

Steps C3 to C6 are thereafter repeated so as to predict the current motion vectors (not represented in FIG. 4) respectively of the partitions P2 to P16 of the current macroblock MBpart, so as to obtain the predicted motion vectors MV2pred, ..., MV16pred.

Once various possible predictions have been calculated by the prediction calculation module PREDCO, in the course of a step C7 represented in FIG. 2, a decision module DCNCO, represented in FIG. 3, traverses the partitioned macroblocks of the image IE and chooses, in this step C7, the prediction mode used to code each of these macroblocks. From among the possible predictions for a macroblock, the decision module DCNCO chooses the optimal prediction according to a rate distortion criterion well known to the person skilled in the art.

Each predicted macroblock is coded, in the course of a step C8, as in the H.264/MPEG-4 AVC standard.

Once this structural coding has been performed by the decision module DCNCO, the coefficients of residuals if they exist, corresponding to the blocks of the image IE, are dispatched to the transform and quantization module TQCO, to undergo discrete cosine transforms followed by a quantization. The slices of macroblocks with these quantized coefficients are thereafter transmitted to an entropy coding module CE so as to produce, with the other images of the video sequence that are already coded in the same manner as the image IE, a binary video stream F coded according to the invention.

The binary stream F is firstly dispatched to an entropy decoding module DE, decoding being inverse to that performed by the entropy coding module CE represented in FIG. 3. Next, for each image macroblock to be reconstructed, the coefficients decoded by the module DE are dispatched to an inverse quantization and inverse transform module QTIDO.

An image reconstruction module RI then receives decoded data corresponding to the data produced by the module DCNCO (FIG. 3) in the coding step C7 according to the invention, to within transmission errors. The module RI implements steps D0 to D8 of the decoding method according to the invention, such as represented in FIG. 6.

The first step D0 is the decoding of data structures coded in a slice of a current macroblock of the image IE to be decoded. In a manner known per se, the reconstruction module RI determines on the basis of the data of said macroblock slice:
- the type of coding of said data, inter according to the invention,
- the type of partitioning of the macroblock to be reconstructed, 4×4 inter in the embodiment described,
- the index of the optimal motion vector such as selected by the decision module DCNCO in the aforementioned step C7.

Figures 5, 6:
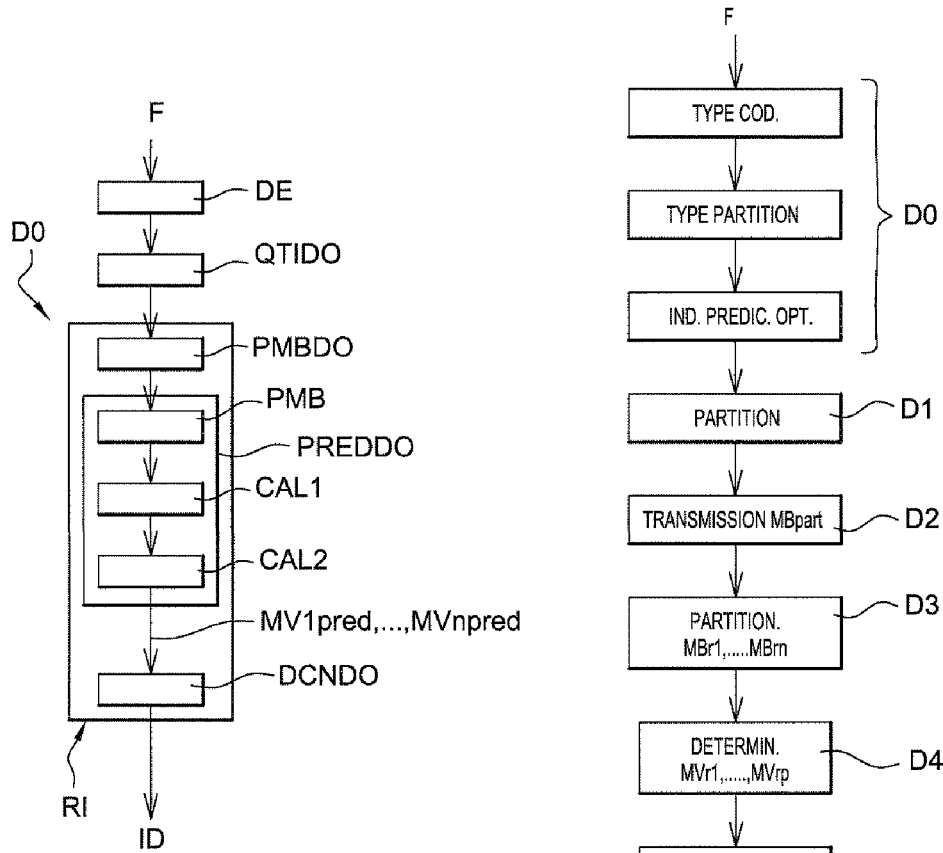
FIG. 5 represents a decoding device according to the invention.
FIG. 6 represents steps of the decoding method according to the invention.

The following step D1 represented in FIG. 6 is the chopping of the current macroblock to be decoded, in accordance with the partitioning determined in step D0. For this purpose, a macroblocks partitioning module PMBDO represented in FIG. 5, which in all respects resembles that represented in FIG. 3, chops the macroblock into a plurality of Np partitions, i.e. sixteen 4×4 partitions in the example represented.

In the course of a step D2 represented in FIG. 6, the partitioning module PMBDO transmits the current macroblock to be decoded and which has just been partitioned into Np partitions, to a prediction module PREDDO represented in FIG. 5, which is in all respects similar to the prediction module PREDCO of the coder CO of FIG. 3, and which, for this reason, will not be described again in detail.

In the course of steps D3 to D6, the prediction module PREDDO performs the same algorithm as that performed by the prediction module PREDDO of the aforementioned coder CO, so as to obtain predicted motion vectors in accordance with the procedure described hereinabove.

In the course of a step D7, a decision module DCNDO chooses the optimal prediction according to a rate distortion criterion well known to the person skilled in the art.

Each predicted macroblock is thereafter decoded, in the course of a step D8, as in the H.264/MPEG-AVC standard.

Once all the macroblocks of the image IE have been decoded, the image reconstruction module RI provides as output from the decoder DO, an image ID corresponding to the decoding of the image IE.

Having regard to the fact that the prediction algorithm performed at the decoder DO is in every respect the same as that performed at the coder CO, the information cost induced by the predictors used is thereby greatly reduced.

The second embodiment described hereinbelow is distinguished from the previous embodiment mainly by the fact that the prediction module PREDCO represented in FIG. 3 performs a temporal prediction of the current motion vectors.

In accordance with the second embodiment, the aforementioned step of selecting partitions C0 is not performed.

In the course of step C1 of FIG. 2, the macroblocks partitioning module PMBCO of FIG. 3 undertakes the chopping of the macroblock MB according to said chosen initial partition, into a number Np of current partitions.

In the example represented in FIG. 7, the current macroblock MB is chopped into three partitions P'1, P'2 and P'3 which are all of different shape and size.

In the course of step C2 of FIG. 2, the partitioning module PMBCO of FIG. 3 transmits the macroblock MBpart which has just been partitioned to the prediction module PREDCO of FIG. 3.

In the second embodiment described here, the prediction module PREDCO is intended to predict the three motion vectors associated respectively with the three partitions P'1, P'2 and P'3 of the current macroblock MBpart, on the basis respectively of three reference motion vectors of one and the same reference macroblock, denoted $MBr_{IE-1}$, having the same position as the current macroblock MBpart in the previous image IE-1. In the example represented in FIG. 7, the previous image IE-1 is the image which has been chosen in the temporal causal zone Ct which comprises reference images other than the image IE-1.

As mentioned hereinabove with reference to the first embodiment, the reference macroblock $MBr_{IE-1}$ has previously been coded and then decoded.

In the course of step C3 of FIG. 2, the partitioning module PMBCO undertakes the chopping of the reference macroblock $MBr_{IE-1}$ according to Nr reference partitions. In the example represented in FIG. 7, the reference macroblock $MBr_{IE-1}$ is chopped in a manner identical to the current macroblock MBpart, i.e. according to three partitions Pr'1, Pr'2 and Pr'3 which are all of different shape and size.

In the course of step C4 represented in FIG. 2, the calculation module CAL1 of FIG. 3 calculates three reference motion vectors MVr'1, MVr'2 and MVr'3 corresponding respectively to the three reference partitions Pr'1, Pr'2 and Pr'3.

In the course of step C5 of FIG. 2, the calculation module CAL2 of FIG. 3 calculates three predictor motion vectors MVp'1, MVp'2 and MVp'3 which are dependent respectively on the three reference motion vectors MVr'1, MVr'2 and MVr'3 obtained in the previous step C4. Such a calculation consists, in the example represented, in performing the following equalities:

MVp'1=MVr'1
MVp'2=MVr'2
MVp'3=MVr'3

In the course of step C6, the prediction module PREDCO of FIG. 3 predicts the motion vectors MV'1, MV'2 and MV'3 of the current partition P'1 respectively on the basis of the three predictor motion vectors MVp'1, MVp'2 and MVp'3 calculated in the previous step.

The prediction calculation module PREDCO of FIG. 3 then delivers three predicted motion vectors MV'1pred, MV'2pred and MV'3pred, the precision of whose prediction is particularly optimized by virtue of the spatial and temporal matching of the partitioning of the current macroblock MBpart and of the partitioning of the reference macroblock $MBr_{IE-1}$.

The following steps of choosing optimal prediction C7 and of coding C8 are respectively similar to the aforementioned steps C7 and C8 of the first embodiment and for this reason, will not be described again.

The reconstruction module RI of the decoder DO thereafter implements steps D0 to D8 similar to those of the decoding method in accordance with the first embodiment.

The first step D0 is the decoding of data structures coded in a slice of a current macroblock of the image IE to be decoded. In a manner known per se, the reconstruction module RI determines on the basis of the data of said macroblock slice:
- the type of coding of said data, inter in the embodiment described,
- the type of partitioning of the macroblock to be reconstructed, arbitrary geometric in the embodiment described,
- the index of the optimal motion vector such as selected by the decision module DCNCO in step C7.

In the course of the following step D1, the macroblocks partitioning module PMBDO chops the macroblock according to the aforementioned three partitions P'1, P'2 and P'3.

Subsequent to the partitioning step D1, in the course of a step D2 similar to that of the aforementioned first embodiment, the partitioning module PMBDO transmits the current macroblock to be decoded and which has just been partitioned into three partitions, to the aforementioned prediction module PREDDO.

In the course of steps D3 to D6, the prediction module PREDDO performs the same algorithm as that performed by the module PREDCO, in the course of the aforementioned steps C3 to C6.

In the course of step D7, the decision module DCNDO chooses the optimal prediction according to a rate distortion criterion well known to the person skilled in the art.

Each predicted macroblock is thereafter decoded, in the course of step D8, as in the H.264/MPEG-AVC standard.

Once all the macroblocks of the image IE have been decoded, the image reconstruction module RI provides as output from the decoder DO, an image ID corresponding to the decoding of the image IE.

It goes without saying that the embodiments which have been described hereinabove have been given purely by way of wholly non-limiting indication, and that numerous modifications may easily be made by the person skilled in the art without, however, departing from the scope of the invention.

Thus for example, the reference macroblock $MBr_{IE-1}$ may be chopped differently from that of the current macroblock to be predicted MBpart.

FIG. 8A represents, dealing in particular with the second embodiment, a reference macroblock $MBr_{IE-1}$ which has been chopped according to the same number of reference partitions Pr'1, Pr'2 and Pr'3 as that for the current macroblock MBpart of FIG. 7. In this example:
- the reference partition Pr'1 has the same shape as the current partition P'1 and is of different size,
- the reference partition Pr'2 has a different shape and size to those of the current partition P'2,
- the reference partition Pr'3 has a different shape and size to those of the current partition P'3.

Moreover, the reference partitions Pr'1, Pr'2 and Pr'3 overlap.

FIG. 8B represents, dealing in particular with the second embodiment, a reference macroblock $MBr_{IE-1}$ which has been chopped according to the same number of reference partitions Pr'1, Pr'2 and Pr'3 as that for the current macroblock MBpart of FIG. 7. In this example, said reference partitions are disjoint and have a shape and/or a size which differ respectively from those of the partitions P'1, P'2 and P'3 of the current macroblock MBpart.

The invention claimed is:

1. A method for decoding a data stream representative of an image or of a sequence of images, said stream comprising data representative of at least one portion of one of said images, said method implementing a step of predicting a motion vector of a partition of a current image portion, with respect to a reference causal zone which has been partitioned previously into a plurality of reference partitions according to a mode of coding determined for said zone,
wherein at the time of the prediction of said motion vector of said current partition, the method comprises:
repartitioning the reference causal zone into a plurality of new reference partitions;
calculating new motion vectors for selected ones of the new reference partitions;
calculating a predictor motion vector based on said calculated new motion vectors; and
predicting the motion vector of said current partition based on said calculated predictor motion vector.

2. A method for coding an image or a sequence of images generating a data stream comprising data representative of at least one portion of one of said images, said method implementing a step of predicting a motion vector of a partition of a current image portion, with respect to a reference causal zone which has been partitioned previously into a plurality of reference partitions according to a mode of coding determined for said zone,
wherein at the time of the prediction of said motion vector of said current partition, the method comprises:
repartitioning the reference causal zone into a plurality of new reference partitions;
calculating new motion vectors for selected ones of the new reference partitions;
calculating a predictor motion vector based on said calculated new motion vectors; and
predicting the motion vector of said current partition based on said calculated predictor motion vector.

3. A method for predicting a motion vector of a partition of a current image portion, with respect to at least one reference causal zone which has been partitioned previously into a plurality of reference partitions according to a mode of coding determined for said zone,
said method comprising, at the time of the prediction of said motion vector of said current partition:
repartitioning the reference causal zone into a plurality of new reference partitions;
calculating new motion vectors for selected ones of the new reference partitions;
calculating a predictor motion vector based on said calculated new motion vectors; and
predicting the motion vector of said current partition based on said calculated predictor motion vector.

4. The prediction method according to claim 3, wherein the selected new reference partitions are in a closest neighborhood of said current partition.

5. The prediction method according to claim 3, wherein one of the selected new reference partitions has a same position as the current partition associated with said reference partition, in an image belonging to the reference causal zone.

6. The prediction method according to claim 5, wherein said one of said selected new reference partitions is of identical shape and identical size to those of the current partition associated with said reference partition.

7. The prediction method according to claim 5, wherein the new reference partitions overlap.

8. The prediction method according to claim 5, wherein the new reference partitions are disjoint.

9. A device for decoding a data stream representative of an image or of a sequence of images, said stream comprising data representative of at least one portion of one of said images, said decoding device comprising a device for predicting a motion vector of a current partition of a current image portion, with respect to a reference causal zone which has been partitioned previously into a plurality of reference partitions according to a mode of coding determined for said zone,
wherein said device controls, at the time of the prediction of said motion vector of said current partition, the following hardware modules:
a partitioning hardware module for repartitioning the reference causal zone into a plurality of new reference partitions,
a first calculation hardware module for calculating new motion vectors for selected ones of the new reference partitions,
a second calculation hardware module for calculating a predictor motion vector on the basis of said calculated new motion vectors, and
a prediction hardware module for predicting the motion vector of said current partition on the basis of said calculated predictor motion vector.

10. A device for coding an image or a sequence of images generating a data stream comprising data representative of at least one portion of one of said images, said device comprising a device for predicting a motion vector of a current partition of a current image portion, with respect to a reference causal zone which has been partitioned previously into a plurality of reference partitions according to a mode of coding determined for said zone,
wherein said device controls, at the time of the prediction of said motion vector of said current partition, the following hardware modules:
a partitioning hardware module for repartitioning the reference causal zone into a plurality of new reference partitions,
a first calculation hardware module for calculating new motion vectors for selected ones of the new reference partitions,
a second calculation hardware module for calculating a predictor motion vector on the basis of said calculated new motion vectors, and
a prediction hardware module for predicting the motion vector of said current partition on the basis of said calculated predictor motion vector.

11. A device for predicting a motion vector of a current partition of a current image portion, with respect to a reference causal zone which has been partitioned previously into a plurality of reference partitions according to a mode of coding determined for said zone,
said device controlling, at the time of the prediction of said motion vector of said current partition, the following hardware modules:

a partitioning hardware module for repartitioning the reference causal zone into a plurality of new reference partitions, a first calculation hardware module for calculating new motion vectors for selected ones of the new reference partitions, a second calculation hardware module for calculating a predictor motion vector on the basis of said calculated new motion vectors, and a prediction hardware module for predicting the motion vector of said current partition on the basis of said calculated predictor motion vector.

12. A non-transitory computer program product comprising instructions for implementing the decoding method according to claim 1, when it is executed on a computer processor.

13. A non-transitory computer program product comprising instructions for implementing the coding method according to claim 2, when it is executed on a computer processor.

14. A non-transitory computer program product comprising instructions for implementing the prediction method according to claim 3, when it is executed on a computer processor.

\* \* \* \* \*